United States Patent
Kudriavtsev et al.

(10) Patent No.: US 10,127,026 B2
(45) Date of Patent: Nov. 13, 2018

(54) PROGRAMMING LANGUAGE SOURCE CODE CONVERSION

(71) Applicant: Oracle International Corporation, Redwood Shores, CA (US)

(72) Inventors: Petr Andreevich Kudriavtsev, Saint-Petersburg (RU); Vladimir Viktorovich Voskresenskii, Saint-Petersburg (RU)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/725,808

(22) Filed: Oct. 5, 2017

(65) Prior Publication Data

US 2018/0275977 A1 Sep. 27, 2018

(30) Foreign Application Priority Data

Mar. 24, 2017 (RU) .................. 2017110071

(51) Int. Cl.
*G06F 9/44* (2018.01)
*G06F 8/51* (2018.01)

(52) U.S. Cl.
CPC ..................... *G06F 8/51* (2013.01)

(58) Field of Classification Search
None
See application file for complete search history.

(56) References Cited

U.S. PATENT DOCUMENTS

| 7,346,897 B2 * | 3/2008 | Vargas ............... G06F 8/51 717/136 |
| 8,332,828 B2 | 12/2012 | Vargas |
| 8,656,372 B2 | 2/2014 | Vargas |
| 8,819,650 B2 | 8/2014 | Barcia et al. |
| 9,086,931 B2 | 7/2015 | Vargas |

(Continued)

OTHER PUBLICATIONS

Alomari et al., "Comparative Studies of Six Programming Languages", Apr. 2, 2015, 71 pages, https://arxiv.org/ftp/arxiv/papers/1504/1504.00693.pdf. [Retrieved Apr. 30, 2018].

(Continued)

*Primary Examiner* — Philip Wang
*Assistant Examiner* — Rongfa P Wang
(74) *Attorney, Agent, or Firm* — Meyertons Hood Kivlin Kowert and Goetzel PC; Rory Rankin

(57) ABSTRACT

Systems, apparatuses, and methods for converting computer program source code from a first high level language to a functionally equivalent second high level language different from the first high level language. Source code in a first high level language is analyzed. In response to identifying a derived class in the source code in and determining that the derived class includes more than one base class that includes state information, new source code in the second high level language is generated that includes a class with fields for only one of the base classes that includes state information, separate interfaces in the second high level language that correspond to each base class of the more than one base class other than the one of the base classes that includes state information, and a derived class that corresponds to the derived class in the first high level language. The derived class implements the separate interfaces.

20 Claims, 12 Drawing Sheets

(56) References Cited

U.S. PATENT DOCUMENTS

| | | | |
|---|---|---|---|
| 9,524,175 B2 | 12/2016 | Cimadamore et al. | |
| 2007/0169040 A1* | 7/2007 | Chen ..................... | G06F 9/4492 717/146 |
| 2008/0141219 A1* | 6/2008 | Chinnici ............... | G06F 9/4492 717/116 |
| 2008/0222616 A1* | 9/2008 | Cheng ................... | G06F 8/51 717/137 |
| 2009/0031291 A1* | 1/2009 | Adams ................... | G06F 8/51 717/137 |
| 2018/0081654 A1 | 3/2018 | Kudriavtsev et al. | |
| 2018/0081655 A1* | 3/2018 | Kudriavtsev ............. | G06F 8/51 |

OTHER PUBLICATIONS

Malabarba et al., "MoHCA-Java: a tool for C++ to Java conversion support", Proceedings of the International Conference on Software Engineering, Feb. 1999, 4 pages, http://web.cs.ucdavis.edu/~devanbu/dp.tex.pdf. [Retrieved Apr. 30, 2018].

Martin et al., "C to Java Migration Experiences", Proceedings of the Sixth European Conference on Software Maintenance and Reengineering, Mar. 13, 2002, 11 pages, http://citeseerx.ist.psu.edu/viewdoc/download?doi=10.1.1.9.2894&rep=rep1&type=pdf. [Retrieved Apr. 30, 2018].

Martin et al., "Strategies for Migration from C to Java", Proceedings of the Fifth European Conference on Software Maintenance and Reengineering, Mar. 14, 2001, 10 pages, https://pdfs.semanticscholar.org/5fcc/0219ea8ab9ab9f38eb27ce4ec31662366902.pdf. [Retrieved Apr. 30, 2018].

Saini et al., "An Analytical Study of C++ to Java Migration Strategy Using Conversion Tool", International Journal of Computer Application and Technology, Techno Publications, May 2014, pp. 75-78, http://www.academia.edu/7398578/An_Analytical_Study_of_C_to_Java_Migration_Strategy_Using_Conversion_Tool. [Retrieved Apr. 30, 2018].

Stricker, Scott, "Java programming for C/C++ developers", IBM Corporation, May 28, 2002, 47 pages, https://www.seas.upenn.edu/~cis1xx/resources/JavaForCppProgrammers/j-javac-cpp-ltr.pdf. [Retrieved Apr. 30, 2018].

* cited by examiner

*Original derived class "C" with 3 base classes "Base", "A", and "B"*

PROGRAMMING LANGUAGE SOURCE CODE CONVERSION

CROSS REFERENCE TO RELATED APPLICATIONS

This patent application claims priority to and the benefit of Russian Patent Application No. 2017110071, filed on Mar. 24, 2017, the contents of which are hereby incorporated by reference in their entirety.

BACKGROUND

Technical Field

This disclosure relates to computing systems, and more particularly to translating computer program source code from a first high level language to a second high level language.

Description of the Related Art

Most businesses today rely heavily on computer programs to efficiently and effectively run and manage their operations. For example, businesses rely on computer programs to manage inventory, distribution, accounting, employee management, and so on. Likewise, individuals rely on computer programs to manage and enhance their daily lives. For example, individuals may use various programs on desktop or mobile devices to create documents, manage their personal finances, and track their kid's school activities. As such, computer programs are an indispensable part of our everyday lives.

Given the importance of computer programs in the society, maintaining such programs is of critical importance. When a program fails, the consequences can be far reaching. In addition to ensuring computer programs are properly maintained, it is often the case the programs are enhanced or modified to add new features. Such new features may be required to accommodate a new business process or procedure, or may simply be a feature deemed desirable by users of the computer program.

One important feature of modern computer programs are that they are typically written in a high level language, such as the C++ programming language or the JAVA® programming language (JAVA, or JAVA as used herein, is a registered trademark of Oracle and/or its affiliates). This high level language representation of a computer program is referred to as the source (program) code. Generally speaking, high level programming languages are languages that are first compiled or otherwise converted to a form which is executable by a given physical or virtual machine. Generally speaking, this executable form represents machine code, or an intermediate form (e.g., bytecode). In contrast to the high level language which is not understandable by the target machine (physical or virtual), the converted code is executable by the target machine. In order to convert the high level language, compilers or other converters are used. In some cases, the high level language is entirely converted before execution. In other cases, the high level language may be converted at runtime. One feature of high level programming languages is that they can be used to represent functionality without regard to any particular machine. This permits programmers to focus on the desired functionality of the program, rather than particulars of a machine upon which it will be executed. It is the responsibility of the compiler (or other converter) to translate the high level language to the instructions needed by the target machine. In addition, high level programming languages are easier for people to read and understand than programs that are not written in a high level language. Consequently, they are easier to maintain and enhance as described above. In addition, such languages allow for the expression of more abstract ideas and the creation of more functionality with less programmer effort.

While maintaining the original and revised source code is important, in some cases there is a desire to convert (or translate) source code from one high level language to another high level language. Some reasons for converting from one high level language to another high level language may include a move to a new development system or environment, a desire to take advantage of features not available in the original source code, a desire for more portable program code, or otherwise. While some tools exist to aid in automating the conversion from one high level language to another, it is often very difficult to relate converted source code to the original source code from which it was generated.

SUMMARY

Various embodiments of a system, apparatus, and methods for translating computer program code from a first high level language to a second different high level language are described herein. In various embodiments, source code in a first high level language is analyzed by a code conversion tool. A data structure representing the source code in the first language is generated that includes at least an identification of each symbol used within the source code in the first language. Source code in the second high level programming language is generated that is functionally equivalent to the source code in the first high level programming language.

In addition to the above, the data structure representing the source code in the first language is analyzed to identify derived classes in the source code and determine whether the derived class includes more than one base class that includes state information. In response to identifying such a derived class, new source code in the second high level language is generated that includes a class with fields for only one of the base classes that includes state information. In addition, separate interfaces are generated in the second high level language that correspond to each base class of the more than one base class other than the one of the base classes that includes state information. Further, a derived class that corresponds to the derived class in the first high level language is generated that implements the generated interfaces.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Figure 1:
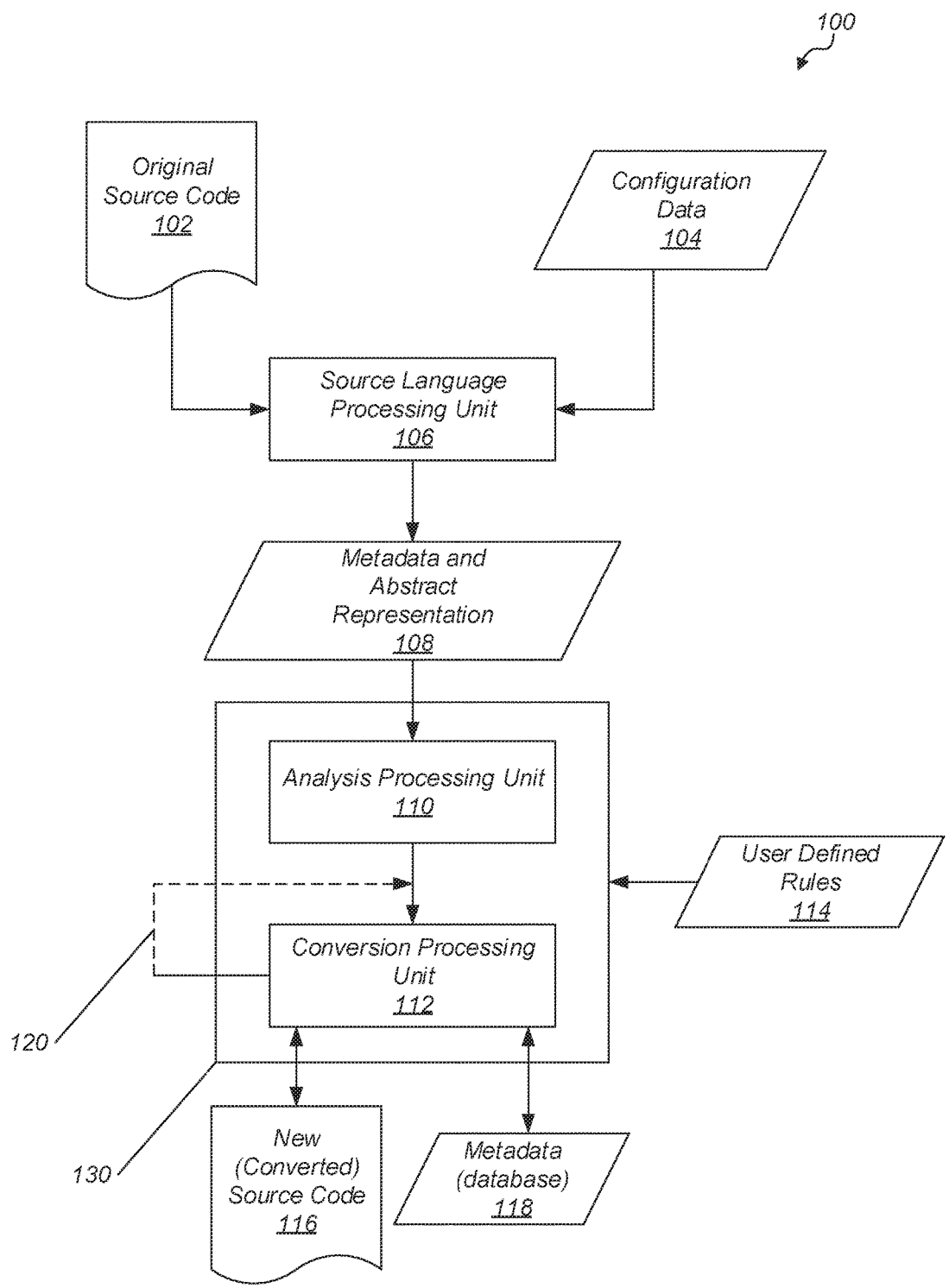
FIG. 1 illustrates an overview of a workflow for translating source code from an original high level language to a new high level language.

FIG. 1 illustrates a workflow for analyzing original source code in a high level language and converting (or translating) the original source code to a new source code in a second high level language that is functionally equivalent to the original source code. As used herein, a high level language refers to a programming language that is expressed in human-readable code that applies a common language specification for understanding human-readable words to express desired software functionality. Examples of high level languages include the programming languages C, C++, JAVA®, Python, JAVAScript, PHP, as well as many others. In the illustrated embodiment, various sources of data and units configured to process data are depicted and are discussed below.

As shown in FIG. 1, a source language processing unit (or tool) 106 is illustrated. In various embodiments, this source language processing unit 106 may comprise or other corresponds to one or more units typically associated with a compiler frontend. To this end, the source language processing unit 106 includes functionality to analyze original source code 102 and produce metadata and/or one or more abstract representations of the original source code. Such metadata and abstract representation may include a symbol table and an abstract syntax tree. Those skilled in the art will appreciate a variety of other types of data may be produced by a compiler frontend or similar tool. In one embodiment, a publically available "Clang" based frontend tool is used for this purpose. Clang is a frontend compiler for C based languages such as C, C++, Objective-C, and others. Generally speaking, the source language processing unit 106 is configured to process source code corresponding to a particular high level language—such as the C programming language, the C++ programming language, the PHP programming language, the JAVA programming language, and so on. In the example shown, configuration data 104 may be used to configure the source language processing unit 106 in various ways. For example, the configuration data 104 may indicate a particular type of source code to be processed, potential optimizations to the code, and so on. Additionally, configuration data 104 may be used to indicate a type of target code that is ultimately desired. A variety of such options are possible and are contemplated.

Also illustrated in FIG. 1 are an analysis processing unit (or tool) 110 and a conversion processing unit (or tool) 112. In various embodiments, each of the units illustrated in FIG. 1 represent executable program code. Though it is to be understood that in other embodiments units or even portions of such units may represent hardware (e.g., circuitry designed to perform the functionality of the corresponding unit). For ease of discussion, each of units 106, 110, and 112, are depicted as separate and distinct units. As such they may represent, and be implemented, as completely separate units. For purposes of discussion, the units 110 and 112 may be collectively referred to as a code conversion tool despite the fact they may be implemented as separate and distinct tools. In one embodiment, source language processing unit 106 represents one application (or tool) and analysis and conversion units 110 and 112, respectively, together form a second application (or tool) 130. Alternatively, all units may be included as part of a single tool or application.

As shown in the example, source language processing unit 106 takes as input original source code 102 and generates metadata and abstract representation 108. In various embodiments, the metadata and/or abstract representation includes an identification of each symbol used in the source code. In addition, symbols or statements with a particular meaning are identified. Symbols, statements, and collections of statements or symbols with such semantic content are identified and may generally be referred to herein as "semantic entities." Examples of semantic entities include, but are not limited to, constructors, fields, local variables, methods and functions, packages, parameters, types, and so on. Additionally, in some embodiments, a fully qualified name (FQN) may be generated for each symbol. As those skilled in the art understand, an FQN may be used in order to disambiguate otherwise identical symbols within a given namespace. Such an FQN will be further discussed below. This generated metadata and abstract representation is then analyzed by analysis processing unit 110. In one embodiment, analysis and processing unit 110 and conversion processing unit 112 are designed to analyze the data 108 with the goal of producing functionally equivalent source code in a high level language 116 other than the original source code 102. For purposes of discussion, the programming language represented by the original source code 102 will be the C++ programming language (the source language), and the new source code 116 generated by the application 130 will be the JAVA programming language (the target language). However, upon consideration of the present disclosure, those skilled in the art will appreciate that the principles, methods, and mechanisms described herein may be applied different source and target languages.

In one embodiment, the processing performed by the analysis processing unit 110 and the conversion processing unit 112 may be at least in part iterative. For example, as will be described in greater detail, analysis processing unit 110 may analyze the data generated by the source language processing unit 106. Based upon this analysis, the analysis processing unit 110 creates data that identifies structures and elements in the original source code 102 that require corresponding code in the new source code 116. Conversion processing unit 112 further generates metadata 118 that associates the converted source code to the original source code. Based upon this data, the conversion processing unit 112 generates corresponding source code 116. In various embodiments, the new source code 116 includes annotations that provide additional information regarding the conversion and enable additional functionality as will be described. In various embodiments, the initially generated new source code 116 is not deemed fully complete until it has been analyzed further. Such analysis may be performed by unit 112 and/or unit 110. If it is determined that the generated source code 116 requires modification, then conversion processing unit 112 may iterate 120 or otherwise modify the new source code. In various embodiments, reasons for modifying the new source code 116 may include determining the initially generated new source code 116 includes syntax errors, is not functionally equivalent to the original source code 102, or some other reason that prevents the new source code 116 from being a usable valid representation of the original source code 102. Similar to the configuration data 104, user defined rules 114 or other configuration data may be used to control the analysis processing unit 110 and/or conversion processing unit 112. Once it is determined that processing by the analysis 110 and conversion processing unit 112 are complete, the workflow of FIG. 1 is complete. In addition to generating corresponding programming statements in the new source code, comments in the original source may also be included in the new source code.

Figure 2:
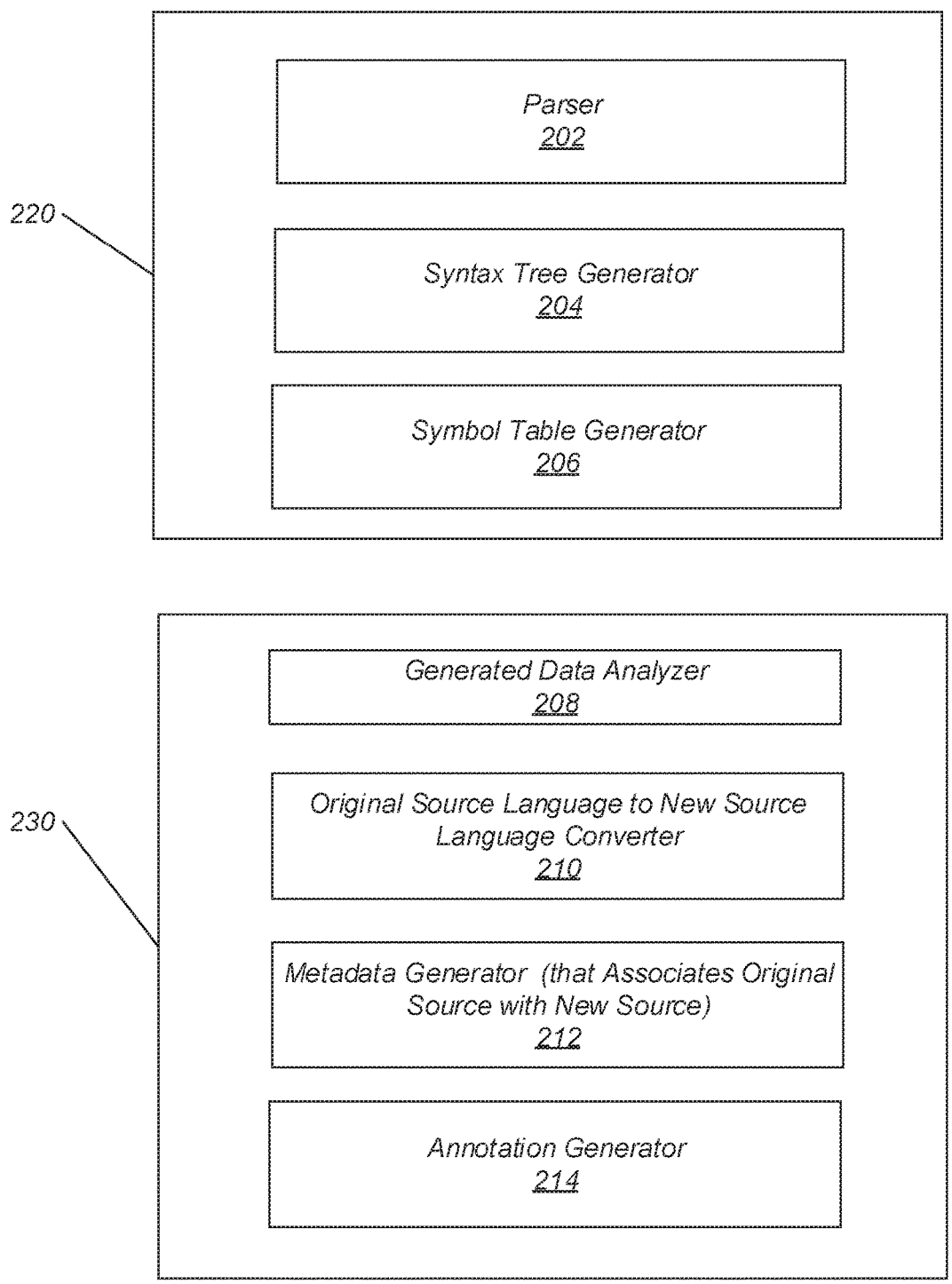
FIG. 2 illustrates one embodiment of program code analysis and conversion elements that may be used in the workflow of FIG. 1.

FIG. 2 illustrates one embodiment of elements or units (or "subunits") corresponding to the source language processing unit 106, the analysis processing unit 110, and conversion processing unit 112 of FIG. 1. In the example shown, block 220 illustrates some unit that may be included in the analysis processing unit 110 of FIG. 1. In this example, the included units include a parser 202, syntax tree generator 204, and symbol table generator 206. It is noted that the analysis processing unit 110 may include additional and/or different functionality not explicitly called out in FIG. 2. For example, it may include functions to perform syntax analysis, semantic analysis, and otherwise.

Block 230 of FIG. 2 illustrates one embodiment of components or units corresponding to the analysis processing unit 110 and conversion processing unit 112 of FIG. 1. In this example, the components include a generated data analyzer 208 to analyze data generated by one or more components of block 220. Also included is an original source language to new source language converter 210 and metadata generator 212 for use in supporting generation of the new source code and associating the new source code with the original source code. FIG. 2 also illustrates inclusion of a converted source code annotation generator 214 configured to annotate the new source code as discussed above. In some embodiments, other units or components may be present to generate executable code (e.g., bytecode or an executable binary) from the newly generated new source code As discussed above, it is a goal of the workflow of FIG. 1 to produce a usable and functionally equivalent new source code that corresponds to the original source code with annotations that bind the converted source code to the original source code. In order to achieve such a binding, metadata is generated while processing the data.

Figure 3:
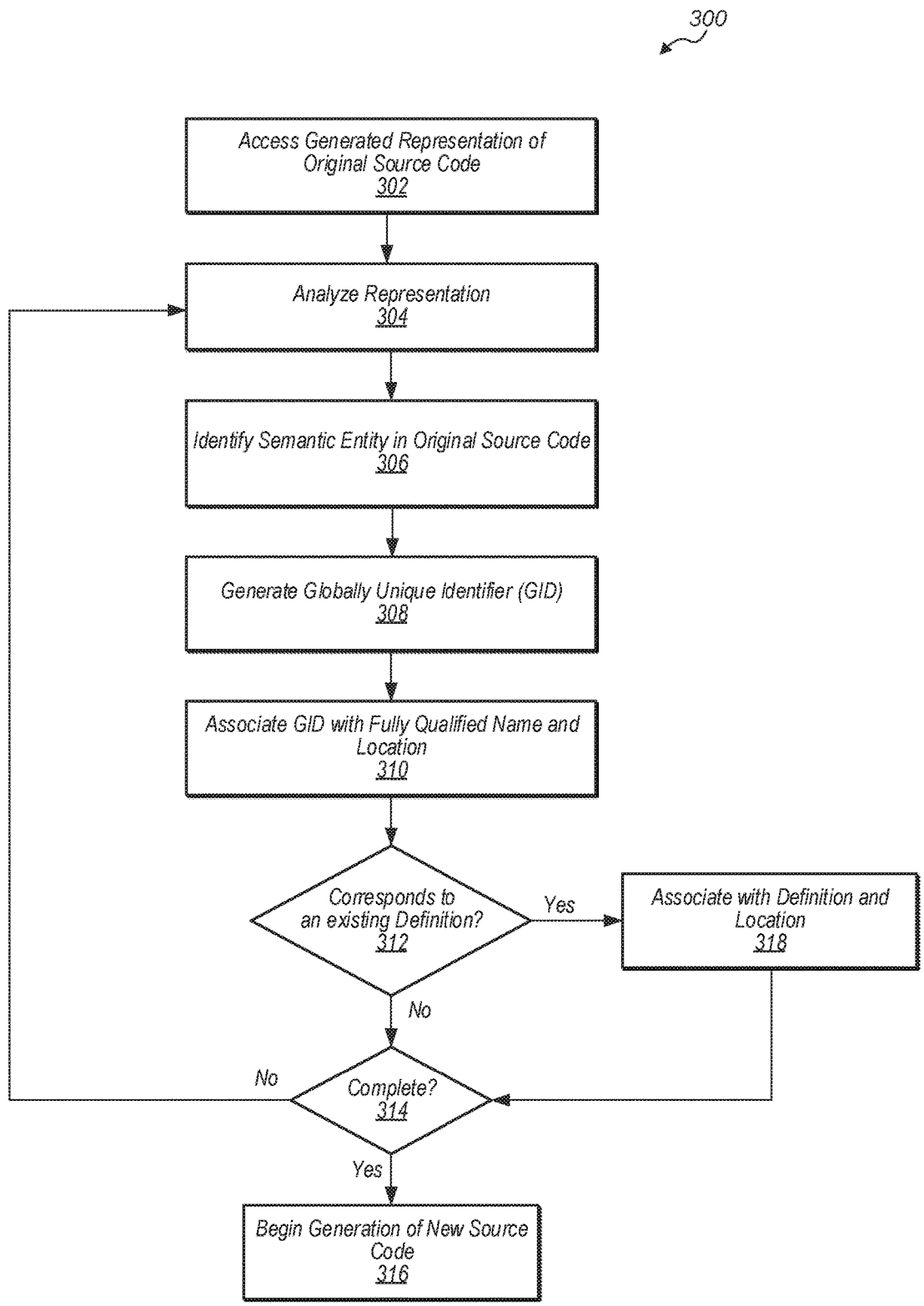
FIG. 3 illustrates one embodiment of a method for generating metadata to bind converted source code to original source code.

FIG. 3 illustrates one embodiment of a method for processing the representation of the original source code. As shown in the example, the code conversion tool accesses the representation of the original source code that was generated by the source language processing unit (block 302) and analyzes the representation (304). Upon identifying each semantic entity in the representation (306), the conversion tool generates a globally unique identifier (GID). Generally speaking, a semantic entity may include any symbol or collection of symbols with identifiable semantic content, such as functions, classes, variable names, and so on. This identification of semantic entities includes a determination as to whether a class is a base class or a derived class. If a class is a derived class, the determination also includes identification of the corresponding base classes. Additionally, any fields (i.e., state information) within classes are identified. Generally speaking, base classes and derived classes are constructs in object oriented programming that allow one entity to "inherit" features, traits, and/or code from another entity. Through such inheritance, one class can access or utilize the features, traits, and/or code of another entity without having to recreate the features, traits, and/or code of the entity. In such a paradigm, a "derived" class inherits features, traits, and/or code of a "base" class. A base class may sometimes be referred to as a "parent" class or "superclass" with a corresponding derived class being referred to as a "child" class, "subclass", or "heir" class. More generally, a class that is used to derive another class is referred to a base class (i.e., it serves as a base for the derivation). It is noted that a chain of inheritance can be created by more than two classes. For example, class C may be derived from class B which is derived from class A.

It is noted that the GID is globally unique with respect to the original codebase, and not just unique with respect to a given namespace. As known to those skilled in the art, a namespace is a given region providing a scope to the identifiers that are within it. Based upon this concept, two identical identifiers may exist as long as they are not within the same namespace. In this manner, namespaces can be used to prevent name collisions. Because large codebases typically include many files and namespaces, some compilers (e.g., such as those used for the C++ programming language) use techniques such as name mangling to disambiguate identical identifiers. While such an approach is useful for its intended purpose, it does not result in identifiers that are globally unique across namespace. Consequently, when converting one source language to another that utilizes different concepts with respect to namespaces, problems may arise when trying to map a converted function to an original function in an original source codebase. To address such problems, block 306 generates a globally unique identifier for each semantic entity. This GID is associated with exactly one semantic entity in the original source code and may also be associated with the original fully qualified name (FQN) (block 310). In various embodiments, the GID is based on the original FQN (which is not globally unique) and is extended with extra markers or symbols to make it globally unique. The same GID is used for a given declaration of a semantic entity and the corresponding definition of the semantic entity in C++. Additionally, the generated GID is the same for the associated entity even in different revisions of the source code. As will be later described, the GID can be used as a (primary) key to query generated metadata (e.g., a metadata database) to get information about a current location, properties, and so on. In various embodiments, such associations may be stored as metadata that is associated with both the original source code and the new source code.

Having generated a GID for the declaration (block 310), a determination is made as to whether this declaration corresponds to an existing definition for the declaration (block 312). This may be determined, for example, by comparing the declaration to already created metadata that identifies already encountered declarations, their names, locations, and namespaces (e.g., via analysis of included files or otherwise). If the declaration is associated with an existing definition, it is associated with the definition. If processing is complete (block 316), then generation of the final (new) source may begin (block 316) or otherwise continue to completion if already begun. Any declarations encountered and processed before encountering their corresponding definitions will also be associated with those definitions when they are encountered.

Figure 4:
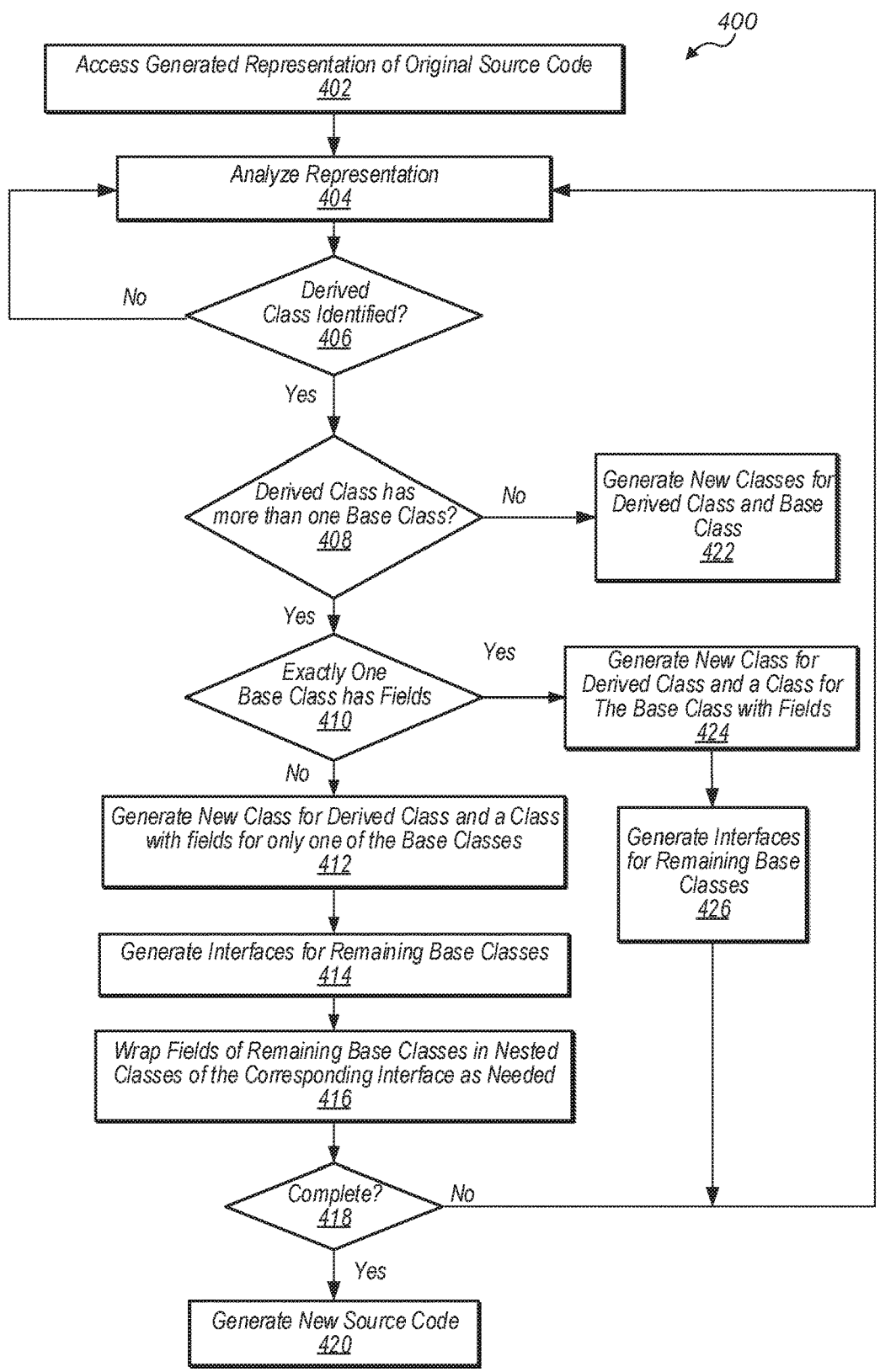
FIG. 4 illustrates one embodiment of a method for generating new source code with that includes multiple inheritance.

FIG. 4 illustrates one embodiment of a method 400 for generating new (converted) source code from original source code with multiple inheritance and at least one base class including one or more fields. In this example, generation of derived classes are emphasized. As such, generation of other new source code is not generally discussed. In one embodiment, the new source code that is generated is in the JAVA programming language. It is noted that while the steps presented in FIG. 4 are shown in a particular order, they may occur in a different order than that presented. In some embodiments two or more of the steps may occur simultaneously. These and other embodiments are possible and are contemplated for FIG. 4 and for the various methods and mechanisms described herein.

In the example of FIG. 4, the metadata that was generated by the earlier processing of the original source code, the generated representation, and analysis, is processed (block 402) to identify structures, entities, and elements of the original source code that are to be re-created or emulated in the new source code. In one embodiment, source files and/or namespaces may be processed separately. In this manner, corresponding namespaces may be created in a similar manner in the target language. For example, in an embodiment in which the target language is the JAVA programming language, code corresponding to a given namespace in the original source code may be processed to generate a JAVA package in new source code. However, in other embodiments, the data may be processed otherwise.

As shown, the generated representation is analyzed (block 404). If it is determined that a derived class is identified in the original source code (block 406), a determination is made as to whether the derived class has more than one base class (block 408). In other words, does this entity represent an example of multiple inheritance? If there is only one base class, then a new class is generated for each of the derived class and the base class (block 422). If, on the other hand, there is more than one base class (block 408), it is further determined whether more than one base class has fields (block 410) (e.g., to represent some state associated with the class). If only one of the base classes has fields, then new classes are generated that correspond to the derived class and base classes (block 424) and interfaces are generated for the remaining base classes (block 426). For example, if the derived class in the original source code has two base classes, then the new code generated will have one (derived) class and two interfaces in the generated JAVA code with the new class implementing the interfaces.

In the JAVA programming language, an interface is a reference type, similar to a class, that can contain only constants, method signatures, default methods, static methods, and nested types. Method bodies exist only for default methods and static methods. Interfaces cannot be instantiated—they can only be implemented by classes or extended by other interfaces. A class that implements an interface must implement all of the methods described in the interface, or be an abstract class. In JAVA, multiple inheritance of classes is not allowed. However, an interface may inherit multiple interfaces and a class may implement multiple interfaces.

If, on the other hand, the derived class has more than one base class (block 408) and has exactly one base class with fields (block 410), then a new class is generated (e.g., a JAVA class) corresponding to the class with the fields (block 412) that retains the original fields. A new class is also generated that corresponds to the derived class (block 424) and interfaces are generated for each of the remaining base classes (426). The new class generated for the derived class implements the generated interfaces. In this manner, the new class inherits the methods of the original base classes and also includes the fields (state) that were present in the original classes. If the processing is complete (block 418), then the new source code may be generated and/or stored (block 420). Otherwise, processing may continue (block 404). By using a method according to method 400, JAVA code may be generated that effectively emulates cases of multiple inheritance in the original source code (e.g., C++ or some other language). Even in cases where more than one base class includes fields representing some state information for the base class.

Figure 5:
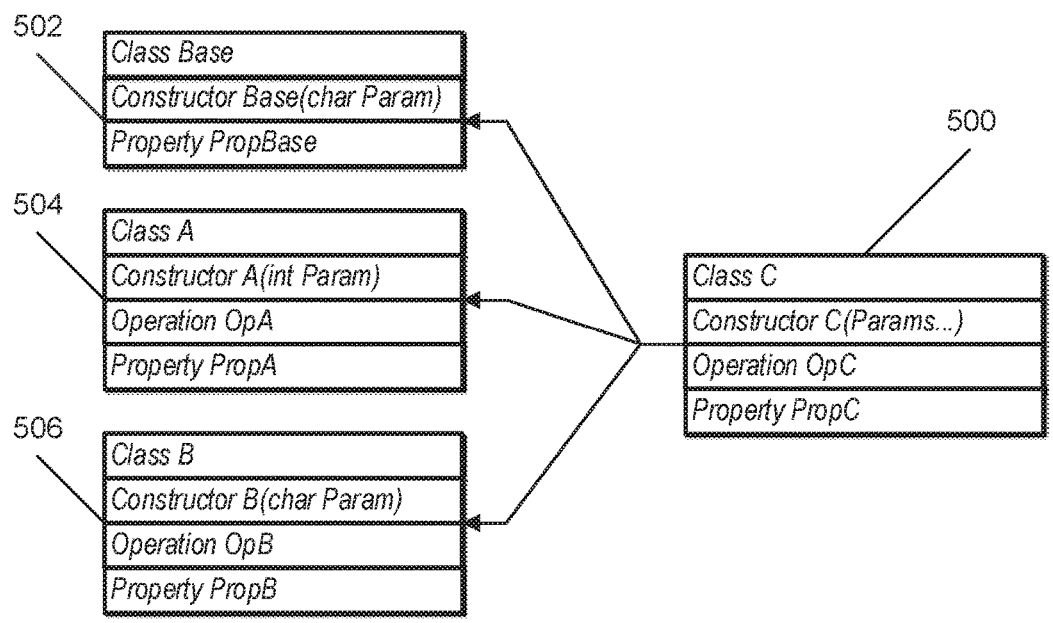
FIG. 5 illustrates one embodiment of the structure of original source code exhibiting multiple inheritance with state information in more than one base class.

In the following discussion, FIGS. 5-8 illustrate application of the method of FIG. 4. FIG. 5 depicts a class hierarchy that may be represented by some original source code that is to be converted from a first high level language to a second high level language. For purposes of discussion, the first high level language is the C++ programming language and the second high level language is the JAVA programming language. In the example shown, a derived class 500 (C) has 3 base classes —502 (Base), 504 (A), and 506 (B). Class Base 502 includes a constructor Base and a property (or field) PropBase. Class A 504 includes a constructor (A), operation (OpA) and property (PropA). Class B 504 includes a constructor, operation (OpB) and property (PropB). The derived class C includes a constructor (C), operation (OpC), and property (PropC). PropA, PropB, and PropC represent fields (some state) of their respective classes.

Figure 8:
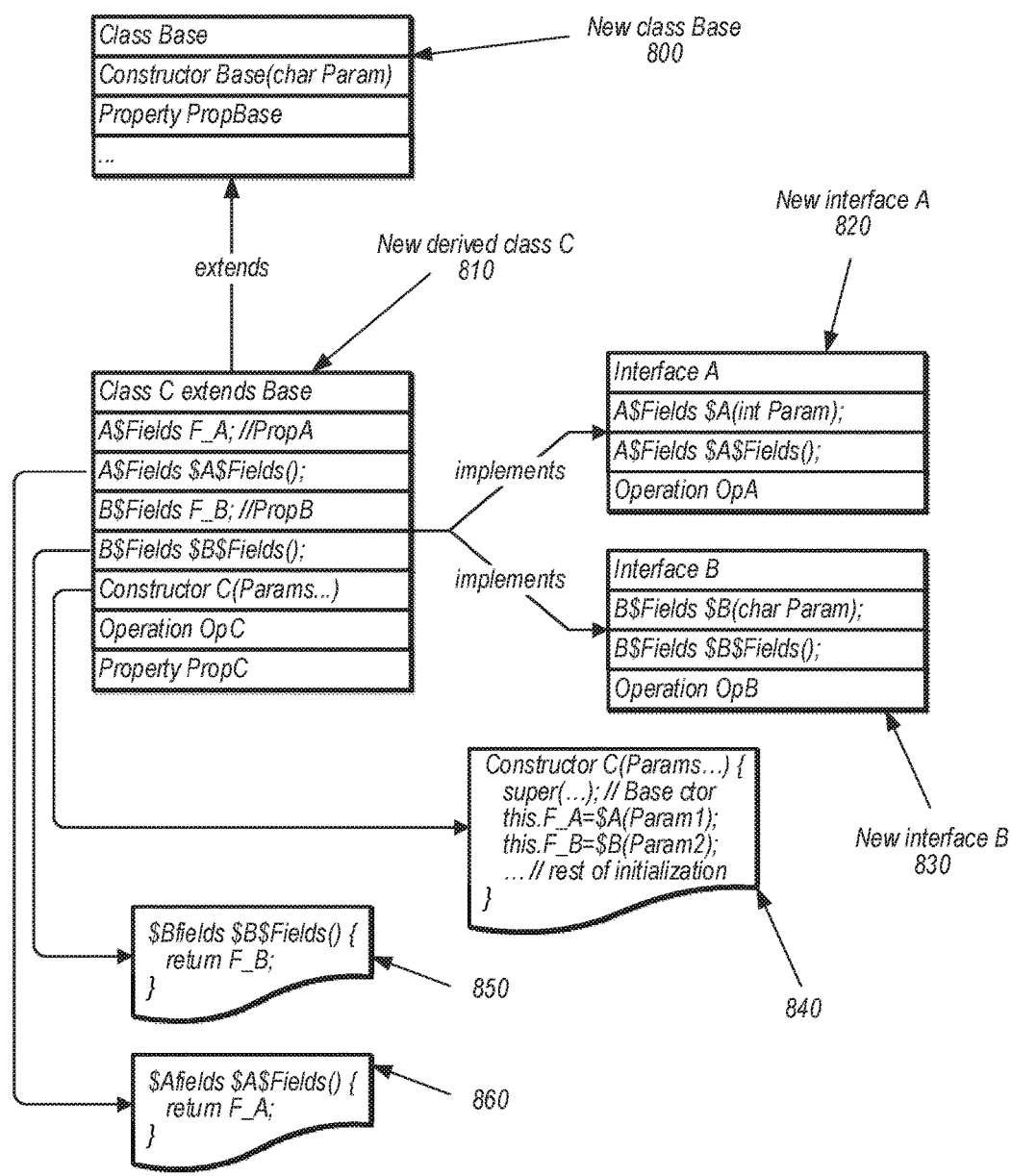

Referring to the example of FIG. 5, and based on the method of FIG. 4, a derived class (C) is identified and it is determined that the derived class has more than one base class (Base, A, and B, in this example). It is further determined that more than one base class has fields (Class Base has the field PropBase, Class A has the field PropA, and class B has the field PropB). Therefore, according to block 412 of method 400, a new class is generated for the derived class and a class with fields is generated for only one of the base classes. In one embodiment, the new derived class extends the class with fields that is generated for only one of the base classes. Both the derived class and the class with fields is generated for only one of the base classes are illustrated in FIG. 8 and will be discussed below. Block 414 of method 400 then indicates that interfaces for the remaining base classes (i.e., base class A and base class B) are generated.

Figure 6:
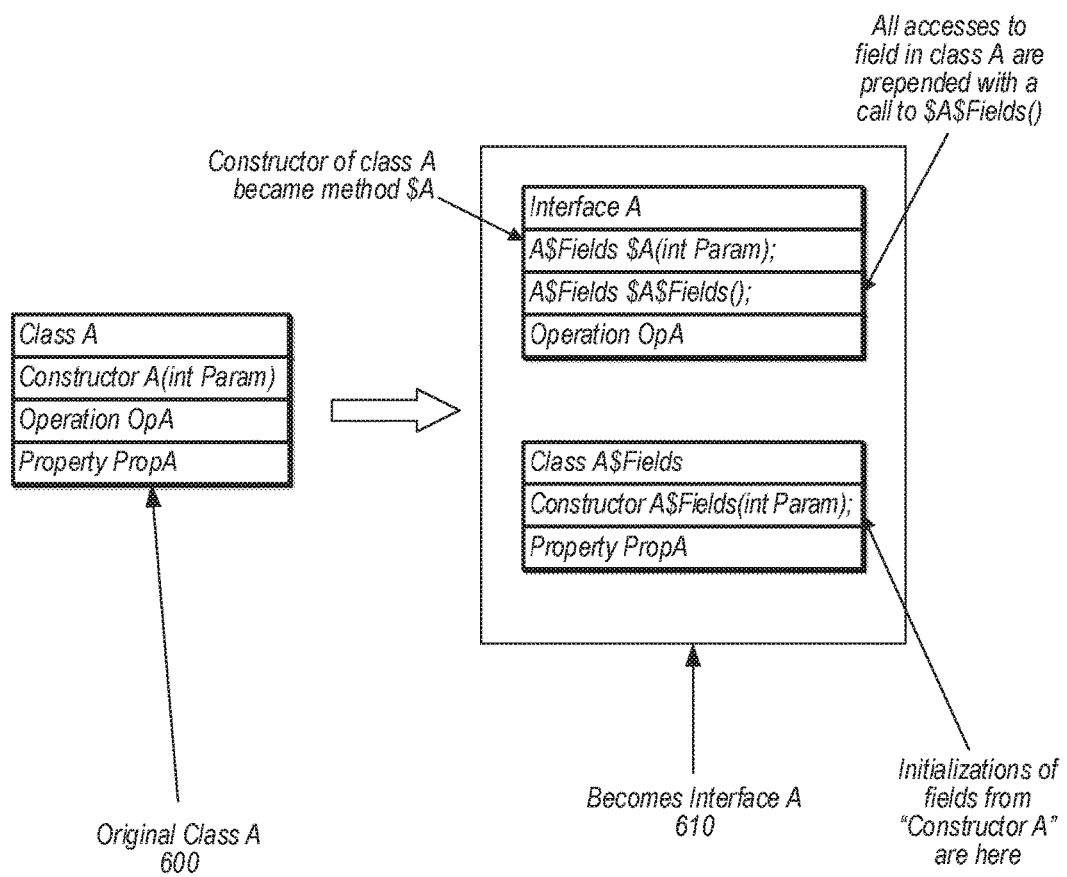
FIGS. 6-8 illustrates one embodiment of the structure of new source code corresponding to the original source code of FIG. 5.
Figure 7:
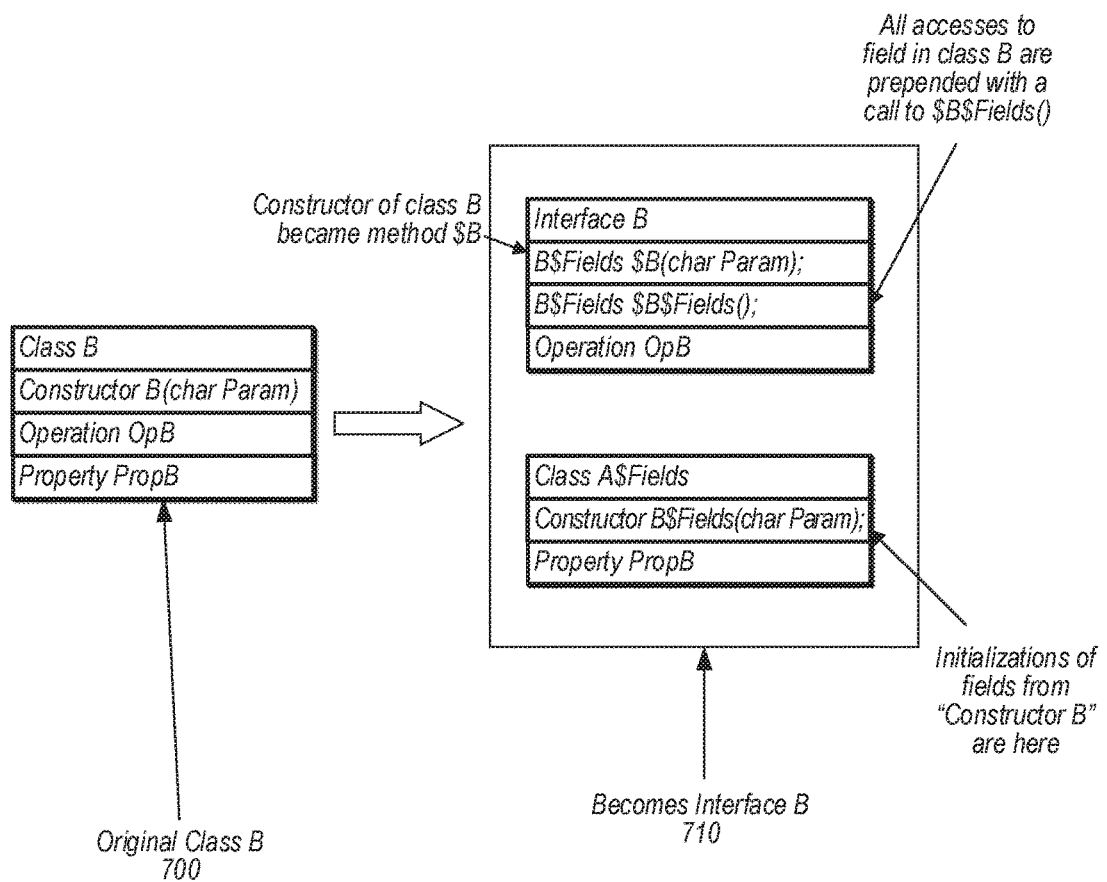

FIG. 6 illustrates the original class A 600 (that corresponds to the class A of FIG. 5) and a corresponding interface 610 (Interface A) that is generated. In the interface 610 that is generated, the constructor (Constructor A) of the original class 600 becomes a method $A with return type A$Fields (which is shown as a class in interface A 610. It is noted that the naming conventions illustrated in FIGS. 6-8 are exemplary only. Other naming conventions than those shown may be used. The interface A 610 also includes method $A$Fields( ) for use in accessing fields corresponding to those that were originally present in the class A (e.g., PropA of class A 600). Also included is the method OpA that was part of class A 600. In addition to the above, interface A 610 is shown to include a class (class A$Fields) which serves to maintain state information of the original class. In this example, the class includes the field PropA that was present in the original class A 600. The class A$Fields also includes a constructor that may be used to initialize the fields (PropA in this example) of the class.

Similar to FIG. 6, FIG. 7 illustrates the original class B 700 (that corresponds to the class B of FIG. 5) and a corresponding interface 710 (Interface B) that is generated. In the interface 710 that is generated, the constructor (Constructor B) of the original class 700 becomes a method $B with return type B$Fields (which is shown as a class in interface B 710. The interface B 710 also includes method $B$Fields( ) for use in accessing fields that were originally present in the class B (e.g., PropB of class B 700). Also included is the method OpB that was part of class B 700. In addition to the above, interface B 710 is shown to include a class (class B$Fields) which serves to maintain state information of the original class. In this example, the class includes the field PropB that was present in the original class B 700. As in the above example, the class B$Fields also includes a constructor that may be used to initialize the fields (PropB in this example) of the class.

FIG. 8 illustrates the new code generated according to block 412 of FIG. 4. As previously mentioned, a class with fields for only one of the base classes is generated. In this example, a new class, Base 800, was generated that corresponds to the original class Base 502 shown in FIG. 5. It is noted that instead of choosing class Base in block 412 of FIG. 4, either of classes A or B could have been chosen to represent the one class. As described above, the new class Base 800 includes the same field(s) (PropBase) present in the original class Base 502 of FIG. 5 as well as a constructor.

Also shown in FIG. 8 is a derived class, class C 810, that corresponds to the derived class 500 of FIG. 5. As shown in the example, Class C 810 extends the base class Base 800. The derived class C 810 includes the fields of the corresponding class 500 of FIG. 5. In this case, those fields include the field PropC. Continuing with the method described in FIG. 4, block 414 indicates interfaces for the remaining base classes are generated. In the present case, the remaining classes are class A 504 and class B 506 of FIG. 5. As shown in FIG. 8, an interface A 820 is generated that corresponds to class A 504 and an interface B 830 is generated that corresponds to class B 506.

Instead of the constructors of the corresponding classes 504 and 506, each of interface 820 and 830 includes a method corresponding to the constructor. For example, interface A 820 includes the method $A and interface B 830 includes the method $B. All accesses to fields of original classes A 504 and B 506 are replaced with accesses to fields of dedicated classes of the corresponding interface that was generated (according to block 416 of FIG. 4. In this example, the dedicated classes used for the original fields of original classes A 504 and B 506 are A$Fields and B$Fields. Accesses to the fields of the dedicated classes are via the methods $A$Fields( ) and $B$Fields( ). Each of these methods returns a corresponding reference (F_A or F_B to generally refer to Fields of class A and Fields of class B) declared in the derived class 810 that implements the interfaces A 820 and B 830. The derived class C 810 stores final references to the dedicated classes A$Fields and B$Fields.

FIG. 8 also shows a sample body 840 for the constructor C of class C 810. In the example shown, the body 840 includes a reference to the constructor ("super( . . . )") of the base class 800, as well as initialization of the final fields F_A and F_B [i.e., via the statements this.F_A=$A(Param1) and this.F_B(Param2)]. Field F_A is the final field within class C where the full state of base class A is maintained. F_A is an instance of A$Fields. Similarly, field F_B is the final field within class C where the full state of base class B is maintained. It is noted that the original class A of FIG. 5 and class B of FIG. 5 are shown to include the fields PropA and PropB, respectively. Accordingly, in the example of FIG. 8, F_A would include PropA as well as any other fields of class A and F_B would include PropB as well as any other fields of class B.

Also shown in FIG. 8 are a sample body 850 and 860 for the methods $A$Fields( ) and $B$Fields( ), respectively. As shown in the example, each of these methods simply returns the value of a corresponding fields-wrapper instance. In this case, method $B$Fields( ) returns the value F_B, and method $A$Fields( ) returns the value F_A.

As seen from the above method of FIG. 4 and the examples presented in FIGS. 5-8, the original source programming language exhibiting multiple inheritance with state information (fields) in more than one base class has been emulated in the new JAVA source programming language. In particular, the new program code includes a base class 800 that corresponds to an original base class 502 and a derived class C 810 that corresponds to the original derived class C 500. Interfaces A 820 and B 830 were then generated for each of the remaining base classes A 504 and B 506. All state information of the original program code (i.e., PropBase, PropA, PropB, and PropC) are represented in the new source program code.

The following example further illustrates how the above described methods may convert program code from C++ to JAVA in cases where the original source code includes cases of multiple class inheritance and more than one base class includes state information (one or more fields). First the original C++ code is presented followed by the generated JAVA code. In the following example, original C++ type source code is shown that includes two base classes—Decl and DeclContext and one derived class ClassDecl. The converted JAVA Code includes a new class Decl that corresponds to the original base class Decl, a new class DeclContext that corresponds to the original class DeclContext, and a new interface ClassDecl that corresponds to the original derived class ClassDecl.

Original C++ BASE CLASS 1 (Decl)

class Decl {

// Fields—The location of the start and end of this decl.

int LocStart, LocEnd;

public:

int getLocStart( ) { return Loc Start;

} int getLocEnd( ) { return LocEnd;

}
}; //End Class Decl
Original C++ BASE CLASS 2 (DeclContext)

```
class DeclContext
{
    // Field - This indicates which class this is.
    unsigned DeclKind;
protected:
    // Fields - The first and last declaration stored within
       this declaration context.
       mutable Decl *FirstDecl, *LastDecl;
public:
    class decl_iterator
    {
        // Field - The current declaration.
        Decl *Current;
    public:
        decl_iterator( ) : Current(nullptr) { }
        explicit decl_iterator(Decl *C) : Current(C) { }
        Decl* operator*( ) { return Current; }
    };
    DeclContext(unsigned DeclKind)
        : DeclKind(DeclKind), FirstDecl(nullptr), LastDecl(nullptr) { }
    decl_iterator decls_begin( ) const { return decl_iterator
       (FirstDecl); }
    decl_iterator decls_end( ) const { return decl_iterator
       (LastDecl); }
}; //End Class DeclContext
```

Original C++ DERIVED CLASS (ClassDecl)
class ClassDecl: public Decl, DeclContext
{
    const char *Name;
public:
    ClassDecl(const char *Name): DeclContext(1), Name
        (Name) {
    }
    const char* getName( ) {
    return Name;
    }
}; // End ClassDecl Based on the methods and mechanisms described herein, the following code conversions will be performed:

| C++ Base Class 1 Decl | --> | JAVA Class Decl |
| C++ Base Class 2 DeclContext | --> | JAVA Interface DeclContext |
| C++ Derived Class ClassDecl | --> | JAVA Class ClassDecl |

The fields DeclKind, FirstDecl, and LastDecl will be included in a nested class within Interface DeclContext. The resulting JAVA program code is illustrated below.
New JAVA Class Decl corresponds to original BASE CLASS 1 Decl
// Based on FIG. 4, block 412—generate base class with fields for only one original base
// class
package multipleinheritance;
public class Decl
{
// The location of the start and end of this decl.
private int LocStart, LocEnd;
/*public:*/
    public int getLocStart( ) {return LocStart;}
    public int getLocEnd( ) {return LocEnd;}
    @Override public String toString( ) {
    return " "+"LocStart="+LocStart+", LocEnd="+LocEnd;
    }
} // End class Decl (base class)

New JAVA Interface DeclContext corresponds to original BASE CLASS 2 DeclContext
// Based on FIG. 4, block 414—generate interfaces for remaining base classes
package multipleinheritance;
import static support.Support*;
// create class to store fields
public interface /*originally a base class in source code */ DeclContext {
    // Fields container
    public static final class DeclContext$Fields {
/*originally protected:*/
    // DeclKind—This indicates which class this is.
    public /*private*/ /*uint*/int DeclKind;
/*originally protected:*/
    // The first and last declaration stored within this declaration context public /*protected*/ /*mutable */Decl /*P*/ FirstDecl, LastDecl;
/*public:*/
    public DeclContext$Fields(int DeclKind) {
    this.DeclKind=DeclKind;
    this.FirstDecl=null;
    this.LastDecl=null;
    }
    }
// optional added exception handling
    public default DeclContext$Fields $DeclContext$Fields( ) {throw new UnsupportedOperationException("Override as final getter in derived");
    }
/*public:*/
    public static class decl_iterator
    {
    // Current—The current declaration.
    private Decl /*P*/ Current;
/*public:*/
    public decl_iterator( ) {
    // : Current(null)
    //START JInit
    this.Current=null;
    //END JInit
    }
    public /*explicit*/ decl_iterator(Decl /*pointer*/ C) {
    // : Current(C)
    //START JInit
    this.Current=C;
    //END JInit
    }
    public Decl /*P*/ $star( ) {return Current;}
    public /*inline*/ decl_iterator(JD$Move_dparam, final decl_iterator /*&&*/$Prm0) {
    // : Current(static_cast<decl_iterator &&>( ).Current)
    //START JInit
    this.Current=$Prm0.Current;
    //END JInit
    }
    @Override public String toString( ) {return " "+"Current="+Current;} // NOI18N
    },
    public default/*interface*/ DeclContext$Fields $DeclContext(/*uint*/int DeclKind) {
    // : DeclKind(DeclKind), FirstDecl(null), LastDecl(null)
    //START JInit
    return new DeclContext$Fields(DeclKind);
    //END JInit
    }

```
    public default/*interface*/ decl_iterator decls_begin( )
/*const*/ {
        return new decl_iterator($DeclContext$Fields( ).First-
            Decl);
    }
    public default/*interface*/ decl_iterator decls_end( )
/*const*/ {
        return new decl_iterator($DeclContext$Fields( ).Last-
            Decl);
    }
}
New JAVA Class ClassDecl corresponds to original Derived
Class ClassDecl
// Based on FIG. 4, block 412—generate derived class
corresponding to original derived
// class. The derived class also implements the interface
DeclContext.
package multipleinheritance;
import static support. Support.*;
public class ClassDecl extends /*public*/ Decl implements
DeclContext {
    private final DeclContext$Fields DCFields;
    @Override
    public DeclContext$Fields $DeclContext$Fields( ) {
        return DCFields;
    }
    private /*const*/ char$ptr /*char P*/ Name;
/*public:*/
    public ClassDecl(/*const*/ char$ptr /*char P*/ Name) {
        // : Decl( ), DeclContext(1), Name(Name)
        //START JInit
        super( );
        this.DCFields=$DeclContext(1);
        this.Name=$tryClone(Name);
        //END JInit
    }
    public /*const*/char$ptr/*char P*/ getName( ) {return
Name;}
    @Override public String toString( ) {
        return "  "+"Name="+Name+super.toString( );} //
            NOI18N
}
```

In addition to the issue of multiple inheritance and base classes with state information, another issue the may arise when converting from one language to another concerns the conversion of translation units. For example, any class in C++ can be introduced in one file (e.g., a header file) that does not include implementations of methods, constructors, or destructors. Rather, these implementations may be provided in separate files. These separate files, along with the header file, may be referred to as "translation units". In contrast, in the JAVA language, a regular class must provide implementations for all methods in the same file (i.e., in one file). Consequently, various problems may arise when converting from C++ to JAVA using existing approaches. One such problem is that when we convert a C++ class into a JAVA class, we may lose the original separation between translation units which usually is meaningful in the original source code. For example, the original separation may group methods inside the class according to their purpose. Another problem that may arise is that combining the multiple translation units of the original source code into a single class in the converted source code may result in the size of the converted class may be quite large. In such cases, the development environment and other tools working with the class (file) may be slow when dealing with that class. For example, in Clang there is a class named Sema. After converting it to JAVA, the resulting class had 148358 lines of code. As may be appreciated, dealing with such large files can be unwieldy and inefficient.

Figure 9:
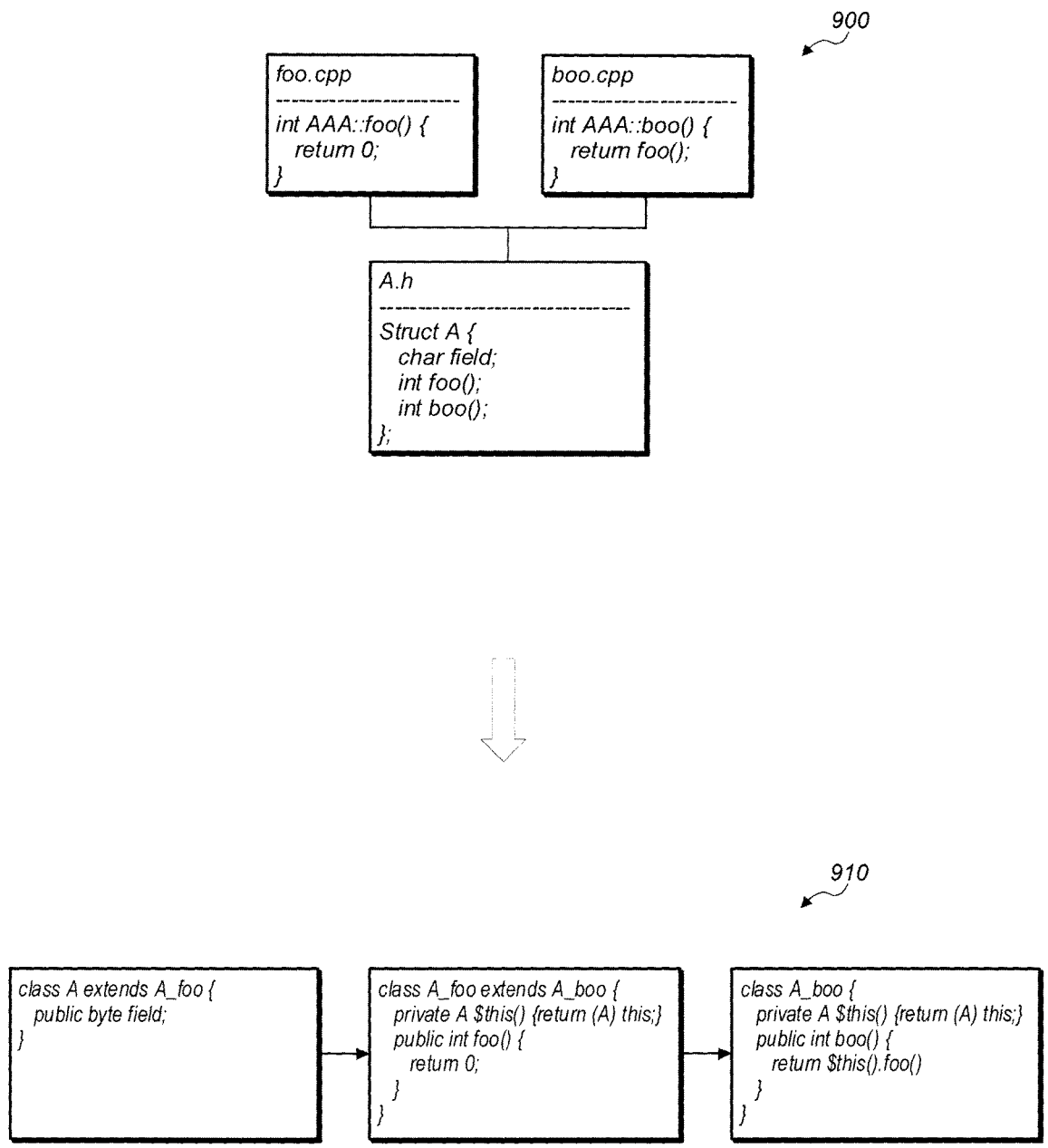
FIG. 9 illustrates one embodiment of a method for converting from a source language to a new language while maintaining separations included in the original.

In order to improve upon the existing approaches, a new method and mechanism is described below that generates new code while maintaining separations in the original code. FIG. 9 illustrates one embodiment of a method for converting from a source language to a new language while maintaining separations included in the original. Generally speaking, the described approach generates an inheritance chain of classes to represent the original source code. For example, assume the original source code 900 depicted in FIG. 9. The example shown represents three separate files in the C++ programming language—A.h, foo.cpp, and boo.cpp, where foo.cpp and boo.cpp (referred to as translation units) include A.h ((referred to as header file).

To convert the original source code 900 while maintaining separate translation units, the following general steps are performed.

1) Generate a separate JAVA class to store all nested enumerations (enums) from C++ class. In one embodiment, the name of the JAVA class is the name of C++ class concatenated with "_NestedEnums". As there are no nested enums in this example, such a class is not created.

2) Generate a separate JAVA class to store all nested classes from C++ class. The name of the JAVA class is the name of C++ class concatenated with "_NestedClasses". As there are no nested classes in this example, such a class is not created.

3) Generate one class per translation unit. In one embodiment, the name of each class is the name of C++ class concatenated with the name of translation unit. Each class contains implementations of methods defined in the corresponding translation unit. In this example, there are two translation units and the header file. Therefore, three classes will be created: one per translation units and one for header file. The C++ class name is "A". Consequently, the names of the classes are A, A_foo, and A_boo. Each of these classes that are generated are represented by a different file—each corresponding to one of the original translation units.

4) The class generated with the same name as the class in C++, class A, contains variables, constructors, destructor, and methods from the C++ class which are defined in place.

The generated classes above are created to form an inheritance chain wherein #4 is those most derived, and #1 is the most base class. Additionally, all classes except #4 have the special method $this( ) which returns class #4. Both implicit and explicit references to "this" in C++ are substituted with the call to this new method.

Based on the above approach, the above represented source code may be converted to the chain of JAVA classes 910 shown in FIG. 9.

As seen in the classes 910, class A_boo is a base class; class A_foo extends A_boo; and class A extends A_foo. In this manner, not only is the original source code semantically emulated in the new code, the new code also emulates the separation of the translation units in the original source code.

Figure 10:
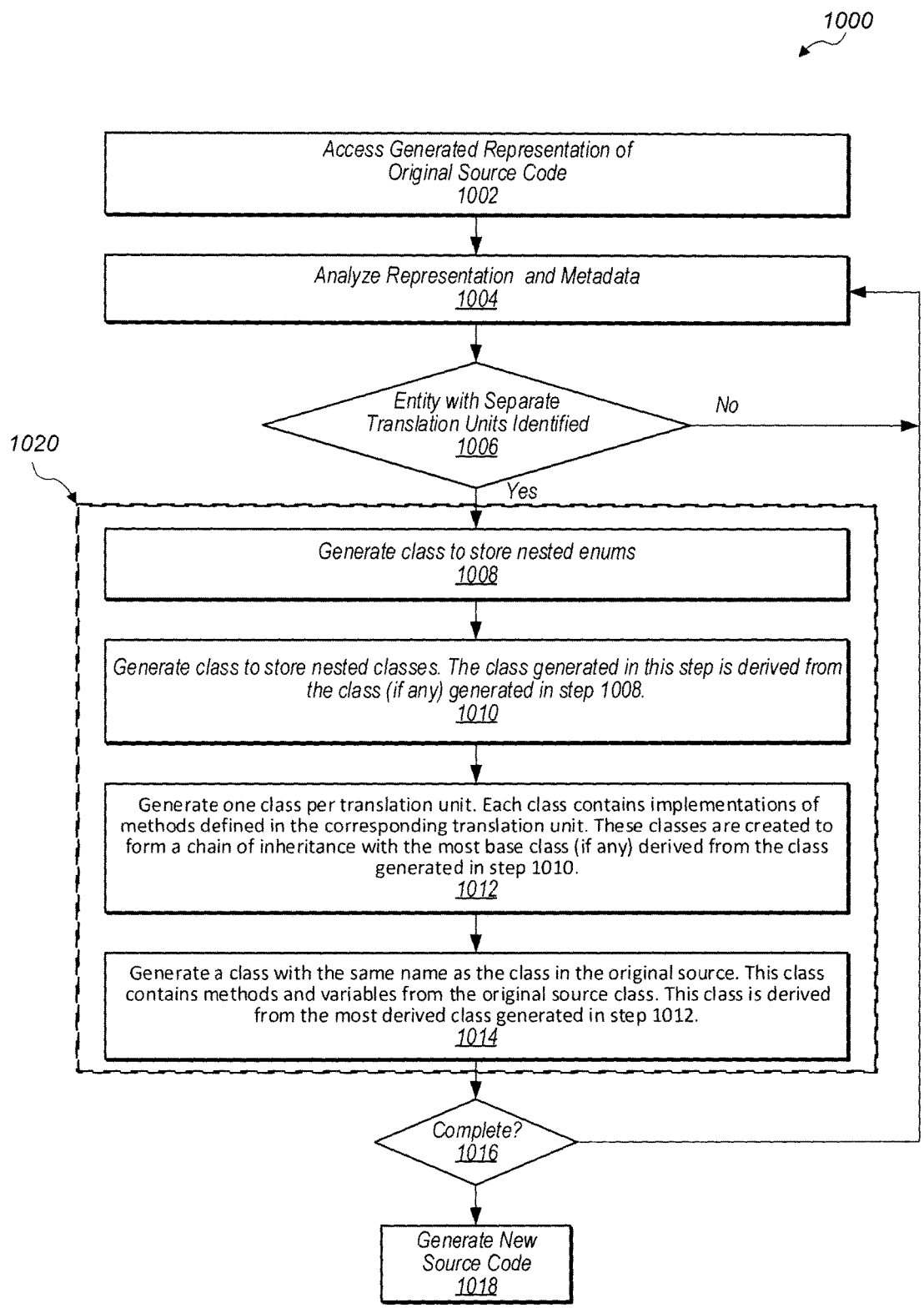
FIG. 10 illustrates one embodiment of a method for generating new source code in a manner that emulates the separation of translation units in the original source code.

FIG. 10 illustrates one embodiment of a method 1000 for converting original source code in a manner that maintains the original separation of files that may be present. In this example, generation of code for multiple translation units are emphasized. As such, generation of other new source code is not generally discussed. the metadata that was generated by the earlier processing of the original source code, the generated representation, and analysis, is processed (block 1002) to identify structures, entities, and elements of the original source code that are to be re-created or emulated in the new source code. The generated metadata also includes identification of files and translation units that make up the original source code.

As shown in FIG. 10, the generated representation and metadata is analyzed (block 1004). If it is determined that an entity with separate translation units is identified in the original source code (block 1006), processing is undertaken (block 1020) to convert the source code from the original language to a new language while maintaining (or otherwise emulating) the separation of the translation units in the original code. In various embodiments, the method identifies entities (e.g., classes, methods) used in one file (e.g., a header file) that are defined elsewhere (e.g., a cpp or other file). Various methods of identifying such compilation dependencies are known and are contemplated.

If such an entity is identified (block 1006), a determination is made as to whether a class to which the translation units correspond (e.g., as defined in the header file) includes any nested enumerations (enums). If such enums exist, then a class is generated to store the nested enums (block 1008). This class may ultimately form the most base class in a chain of classes to be formed. In step 1010, a determination is made as to whether a class to which the translation units correspond includes any nested classes. If such nested classes exist, then a class is generated to store the nested classes (block 1010). If a class was generated in step 1008, the class generated in step 1010 is derived from the class generated in step 1008. Otherwise, this class (if generated) may ultimately form the most base class in a chain of classes to be formed.

Subsequently, a class (in the new language) is generated for each translation in the source language (block 1012). Each of these generated classes includes an implementation of any methods defined in the corresponding translation unit. One of these classes that is generated is derived from the class generated in step 1010. If no class was generated in step 1010, then one of these classes is derived from the class generated in step 1008. If no class was generated in step 1008, then one of these classes is a base class and the remaining classes generated for the translation units are derived from this class to form a chain of inheritance from one class to another (e.g., as illustrated in the example above).

Finally, a class is generated that corresponds to the class entity (e.g., a class defined in a header file). This class contains the methods defined in-place in the original source class, as well as the variables, constructor(s), and destructor(s) of the original source class. In addition, this class is generated such that it is derived from the most derived class generated in step 1012. If processing of the source code is complete (block 1016), then generation of the final converted source code may be completed (block 1018). Otherwise, processing may continue (block 1004). An example illustrating how the above described method of FIG. 10 may convert program code from C++ to JAVA is shown in APPENDIX B.

Figure 11:
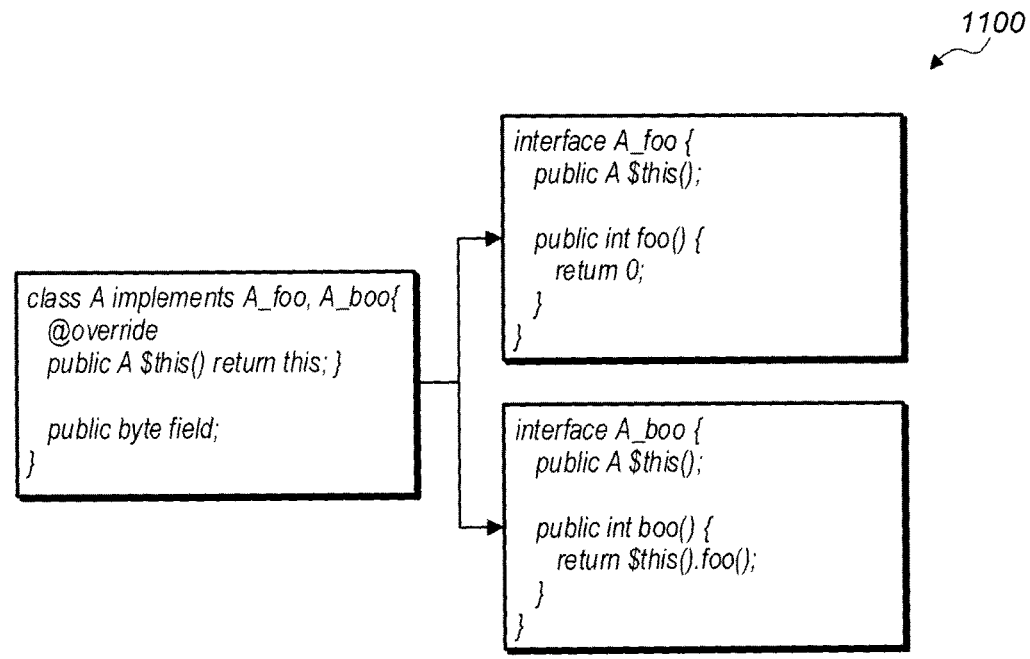
FIG. 11 illustrates one embodiment of a method for generating new source code while maintaining separate translation units.
Figure 11:
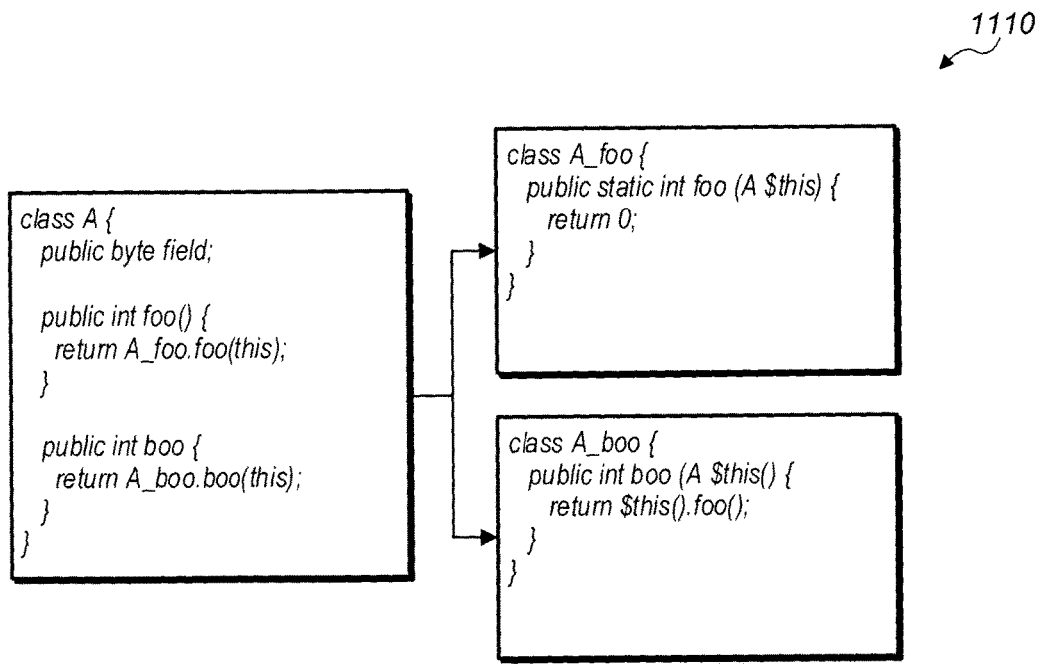

In an alternative to the embodiment of FIG. 9 described above, interfaces may be generated in the JAVA code instead of classes at step 3 as shown in FIG. 11. For example, according to this embodiment, the following steps may be performed to convert the above original source code while maintaining separate translation units.

1) Generate a separate JAVA class to store all nested enumerations (enums) from C++ class. The name of the JAVA class is the name of C++ class concatenated with "_NestedEnums". As there are no nested enums in this example, such a class is not created.
2) Generate separate JAVA class to store all nested classes from C++ class. The name of the JAVA class is the name of C++ class concatenated with "_NestedClasses". As there are no nested classes in this example, such a class is not created.
3) Generate one interface per translation unit. In one embodiment, the name of each interface is the name of the C++ class concatenated with the name of translation unit. Each interface contains implementations of the methods defined in the corresponding translation unit.
4) A class is generated with the same name as the class in C++. It contains variables, constructors, destructor, and methods from the C++ class which are defined in place.

The class generated in step 4 above extends the class of step 2 (if any), which in turn extends the class of step 1 (if any). Each of the generated interfaces declare the method "$this( )" which returns the class generated in step 4. The $this( ) method is implemented in the class generated in step 4. Both implicit and explicit references to "this" in methods inside the interfaces of step 3 are substituted with the call to the "$this( )" method. Assuming the original code of paragraph 29 discussed above, the code generated according to this embodiment may be represented by code 1100.

As another alternative to the embodiment of FIG. 10 described above, delegation may be used in the generated code rather than inheritance. In this case, the first two steps are similar with the third step being different. For example, according to this embodiment, the following steps may be performed to convert the above original source code while maintaining separate translation units.

1) Generate a separate JAVA class to store all nested enumerations (enums) from C++ class. The name of the JAVA class is the name of C++ class concatenated with "_NestedEnums".
2) Generate separate JAVA class to store all nested classes from C++ class. The name of the JAVA class is the name of C++ class concatenated with "_NestedClasses".
3) Generate one class per translation unit. The name of each class is the name of C++ class concatenated with the name of translation unit. Each class contains static implementations of methods defined in the corresponding translation unit.
4) Generate a class with the same name as the class in C++. It contains almost everything from C++ class: variables, constructors, destructor and methods. However, all methods are not implemented but are rather delegated to the static methods from step (3) above. The class generated in this step should extend the class of step 2 which in turn extends class of step 1. The methods of the classes generated in step 3 are made static, therefore they take reference to the class of step 4 as a first argument—with the name of the argument $this. Both implicit and explicit references to "this" in methods inside the classes of step 3 are substituted with the reference to $this argument.

Based on this approach, the code 1110 may be generated.

The following example illustrates how the above described methods may convert program code from C++ to JAVA in a manner to maintain the separation of translation units present in the original source language. First the original C++ code is presented according to the separate files in which it appears. This is followed by the generated JAVA code. In the following example, original C++ type source code is shown that includes two a header file (cls.h) and two translation units/files (foo.cpp and boo.cpp). The converted JAVA Code includes a new class Decl that corresponds to original base class Decl, a new interface DeclContext that corresponds to the original class DeclContext, and a new class ClassDecl that corresponds to the original derived class ClassDecl.

Original C++===Header file "cls.h"===========
```
#ifndef NEWFILE_H
#define NEWFILE_H
struct HugeClass {
public:
    enum Kind {
    Huge, Medium, Small
    };
    struct Internal {
    Kind field;
    Internal(Kind kind): field(kind) { }
    };
private:
    const Internal state;
public:
    HugeClass(Kind kind): state(kind) { }
    int foo( );
    int boo( );
};
#endif /* NEWFILE_H */
```
Original C++===Source file "foo_impl.cpp"===============
```
#include "cls.h"
int HugeClass::foo( ) {
    // huge implementation
    return state.field;
}
```
Original C++===Source file "boo_impl.cpp"===============
```
#include "cls.h"
int HugeClass::boo( ) {
    // huge implementation
    return state.field+foo( );
}
```
New JAVA Class to maintain enums (HugeClass$Nested.JAVA)

```
package separation.approach1;
public class HugeClass$Nested {
    protected final HugeClass $this( ) {
        return (HugeClass) this;
    }
    // enums from original source class HugeClass in cls.h
    public enum Kind {
        Huge, Medium, Small
    };
    public static class Internal {
        public Kind field;
        public Internal(Kind field) {
            this.field = field;
        }
    };
}
```

New JAVA Class corresponding to translation unit foo.cpp (HugeClass$Foo.JAVA)
package separation.approach1;
public class HugeClass$Foo
    public int foo(HugeClass $this) {
        // implementation of foo method
        return $this.state.field.ordinal( );
    }
}

New JAVA Class corresponding to translation unit boo.cpp (HugeClass$Boo.JAVA)
package separation.approach1;
public class HugeClass$Boo {
    public int boo(HugeClass $this) {
        // implementation of boo method
        return $this.state.field.ordinal( )+$this( ).foo( );
    }
}

New JAVA Class corresponding to original class HugeClass (HugeClass.JAVA)
package separation.approach1;
public class HugeClass extends HugeClass$Nested {
    /*private*/ Internal state;
    public HugeClass(Kind kind) {
        this.state=new Internal(kind);
    }
// delegates
public int foo( ) {return HugeClass$Foo.foo(this);}
public int boo( ) {return HugeClass$Boo.boo(this);}
}

Figure 12:
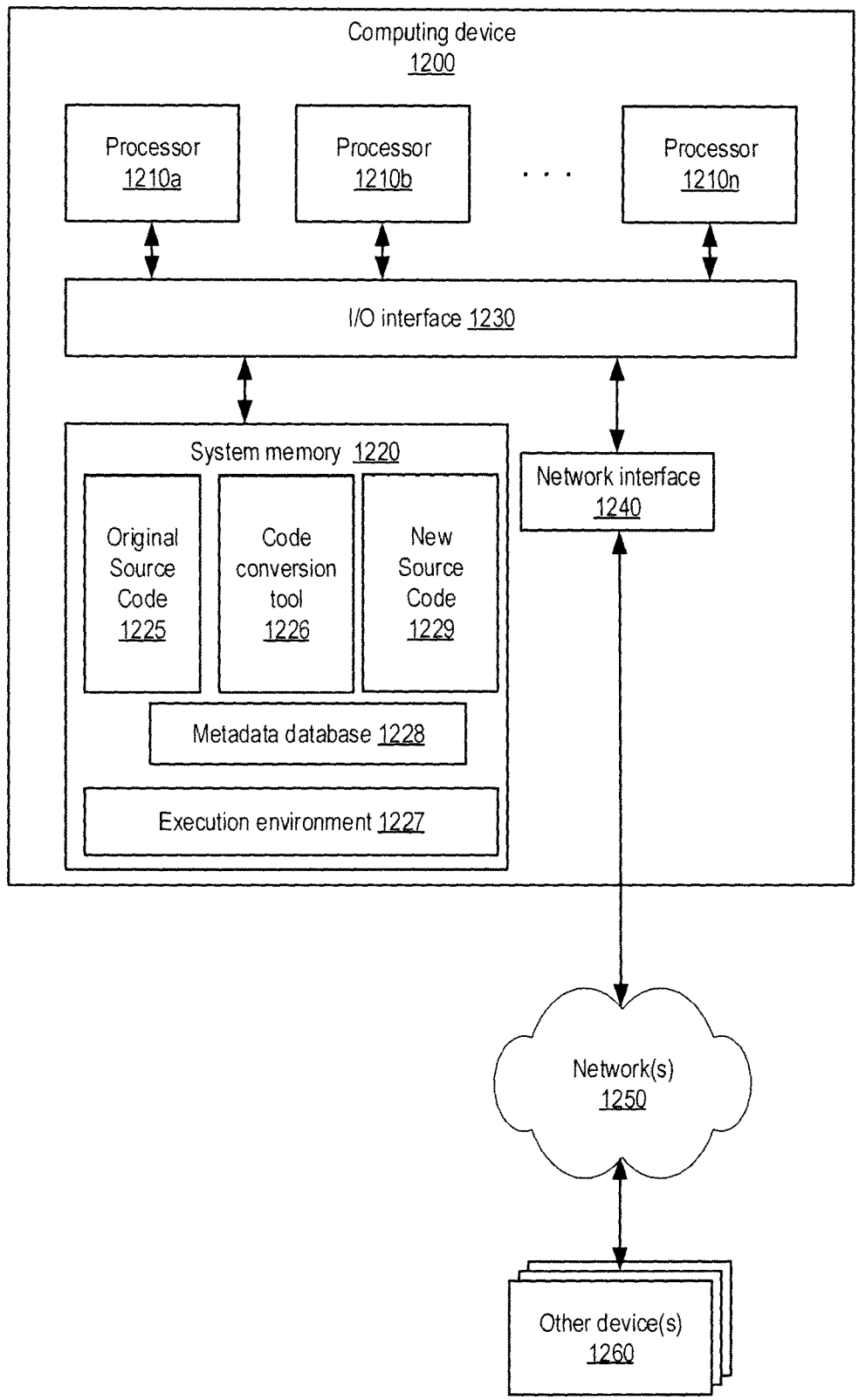
FIG. 12 is a block diagram illustrating a computing device configured to analyze and translate source code according to at least some embodiments.

FIG. 12 is a block diagram illustrating a computing device 1200 comprising circuitry configured to implement a code conversion tool with support for identifying refactoring options of the kind described above, according to at least some embodiments. The computing device 1200 may correspond to any of various kinds of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any kind of computing device. In the illustrated embodiment, computing device 1200 includes one or more cores or processors 1210a-1210n coupled to a system memory 1220 via an input/output (I/O) interface 1230. Computing device 1200 further includes a network interface 1240 coupled to I/O interface 1230.

In various embodiments, computing device 1200 may be a uniprocessor system including one processor 1210, or a multiprocessor system including several cores or processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the SPARC, x810, PowerPC, or MIPS ISAs, or any other suitable ISA. In multiprocessor systems, each of processors 1210 may commonly, but not necessarily, implement the same ISA.

System memory 1220 may be configured to store program instructions implementing a code conversion tool 1226, original source code 1225, and new source code 1229 generated by the code conversion tool 1226, a metadata database 1228, and an execution environment 1227 (e.g., a JAVA virtual machine). System memory may also include program instructions and/or data for various other applications. Program instructions may be encoded in platform native binary, any interpreted language such as JAVA byte-code, or in any other language such as C/C++, JAVA, etc. or in any combination thereof. In various embodiments, system memory 1220 may be implemented using any suitable memory technology, such as static random access memory (SRAM), synchronous dynamic RAM (SDRAM), nonvolatile/Flash-type memory, or any other kind of memory.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computing device 1200 and other devices 1260 attached to a network or networks 1250, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-accessible medium configured to store program instructions and data as described above for FIG. 1 through 5 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1200 via I/O interface 1230. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 1200 as system memory 1220 or another type of memory. Further, a computer-accessible medium may include transmission media or signals such as electrical, electromagnetic, or digital signals, conveyed via a communication medium such as a network and/or a wireless link, which may be implemented via network interface 1240. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A non-transitory computer-readable storage medium storing program instructions that when executed on a computing device cause the computing device to perform:
    receiving, by a code conversion tool, a command to translate source code from a first high level language to source code in a second high level language different from the first high level language;
    accessing, by the code conversion tool, the source code in the first high level language;
    analyzing, by the code conversion tool, the source code in the first high level language;
    responsive to identifying a derived class in the source code in the first high level language and determining that the derived class includes more than one base class that includes state information, generating new source code in the second high level language including:
        a class with fields for only one of the base classes that includes state information;
        separate interfaces in the second high level language that correspond to each base class of the more than one base class other than the one of the base classes that includes state information; and
        a derived class that corresponds to the derived class in the first high level language, wherein the derived class implements the separate interfaces;
    outputting the new source code in the second high level language to a storage device.

2. The non-transitory computer-readable storage medium as recited in claim 1, wherein the derived class extends the class with fields for the only one of the base classes that includes state information.

3. The non-transitory computer-readable storage medium as recited in claim 2, wherein the program instructions are further executable to create a nested class within an interface of the separate interfaces, wherein the nested class includes one or more fields present in a class of the first high level program language.

4. The non-transitory computer-readable storage medium as recited in claim 3, wherein the class with fields for only the one of the base classes that includes state information includes fields corresponding to those of the one of the base classes.

5. The non-transitory computer-readable storage medium as recited in claim 1, wherein the derived class generated in the second high level language includes fields of the more than one base class, and wherein the separate interfaces are generated with a method executable to retrieve a current value of one or more of the fields in the derived class generated in the second high level language.

6. The non-transitory computer-readable storage medium as recited in claim 1, wherein responsive to identifying the derived class in the source code in the first high level language that includes more than one base class, and determining only one base class of the derived class includes fields, generating in the second high level language:
   a new class in the second high level language that corresponds to the only one base class that includes fields, wherein the new class is generated to include said fields;
   separate interfaces that correspond to each base class of the more than one base class other than the only one base class in the first high level language; and
   a derived class that corresponds to the derived class in the first high level language.

7. The non-transitory computer-readable storage medium as recited in claim 1, wherein responsive to identifying a derived class in the source code in the first high level language that includes only one base class, generating in the second high level language:
   a new class in the second high level language that corresponds to the only one base class; and
   a derived class that corresponds to the derived class in the first high level language.

8. A computer implemented method for converting source code from a first high level language to a second high level language, wherein said method comprises:
   a computing device comprising circuitry:
      receiving, by a code conversion tool, a command to translate source code from a first high level language to source code in a second high level language different from the first high level language;
      accessing, by the code conversion tool, the source code in the first high level language;
      analyzing, by the code conversion tool, the source code in the first high level language;
      responsive to identifying a derived class in the source code in the first high level language and determining that the derived class includes more than one base class that includes state information, generating new source code in the second high level language including:
         a class with fields for only one of the base classes that includes state information;
         separate interfaces in the second high level language that correspond to each base class of the more than one base class other than the one of the base classes that includes state information; and
         a derived class that corresponds to the derived class in the first high level language, wherein the derived class implements the separate interfaces;
      outputting the new source code in the second high level language to a storage device.

9. The computer implemented method as recited in claim 8, wherein the derived class extends the class with fields for the only one of the base classes that includes state information.

10. The computer implemented method as recited in claim 9, further comprising creating a nested class within an interface of the separate interfaces, wherein the nested class includes one or more fields present in a class of the first high level program language.

11. The computer implemented method as recited in claim 10, wherein the class with fields for only the one of the base classes that includes state information includes fields corresponding to those of the one of the base classes.

12. The computer implemented method as recited in claim 8, wherein the derived class generated in the second high level language includes fields of the more than one base class, and wherein the separate interfaces are generated with a method executable to retrieve a current value of one or more of the fields in the derived class generated in the second high level language.

13. The computer implemented method as recited in claim 8, wherein responsive to identifying the derived class in the source code in the first high level language that includes more than one base class, and determining only one base class of the derived class includes fields, the method comprises generating in the second high level language:
   a new class in the second high level language that corresponds to the only one base class that includes fields, wherein the new class is generated to include said fields;
   separate interfaces that correspond to each base class of the more than one base class other than the only one base class in the first high level language; and
   a derived class that corresponds to the derived class in the first high level language.

14. The computer implemented method as recited in claim 8, wherein responsive to identifying a derived class in the source code in the first high level language that includes only one base class, the method comprises generating in the second high level language:
   a new class in the second high level language that corresponds to the only one base class; and
   a derived class that corresponds to the derived class in the first high level language.

15. A computing device comprising:
   one or more processing units; and
   a storage device;
   wherein at least one of the one or more processing units is configured to:
      receive a command to translate source code from a first high level language to source code in a second high level language different from the first high level language;
      access the source code in the first high level language;
      analyze the source code in the first high level language;
      responsive to identifying a derived class in the source code in the first high level language and determining that the derived class includes more than one base class that includes state information, generate new source code in the second high level language including:
         a class with fields for only one of the base classes that includes state information;
         separate interfaces in the second high level language that correspond to each base class of the more than one base class other than the one of the base classes that includes state information; and
         a derived class that corresponds to the derived class in the first high level language, wherein the derived class implements the separate interfaces;
      store the new source code in the second high level language to a storage device.

16. The computing device as recited in claim 15, wherein the derived class extends the class with fields for the only one of the base classes that includes state information.

17. The computing device as recited in claim 16, wherein the one or more processing units are further configured to create a nested class within an interface of the separate interfaces, wherein the nested class includes one or more fields present in a class of the first high level program language.

18. The computing device as recited in claim 17, wherein the class with fields for only the one of the base classes that includes state information includes fields corresponding to those of the one of the base classes.

19. The computing device as recited in claim 15, wherein the derived class generated in the second high level language includes fields of the more than one base class, and wherein the separate interfaces are generated with a method executable to retrieve a current value of one or more of the fields in the derived class generated in the second high level language.

20. The computing device as recited in claim 19, wherein responsive to identifying the derived class in the source code in the first high level language that includes more than one base class, and determining only one base class of the derived class includes fields, the one or more processing units are configured to generate in the second high level language:
- a new class in the second high level language that corresponds to the only one base class that includes fields, wherein the new class is generated to include said fields;
- separate interfaces that correspond to each base class of the more than one base class other than the only one base class in the first high level language;
- a derived class that corresponds to the derived class in the first high level language.

* * * * *